United States Patent [19]

McGowan, III et al.

[11] Patent Number: 4,806,905

[45] Date of Patent: Feb. 21, 1989

[54] TRANSMITTER FOR TRANSMITTING ON A TWO-WIRE TRANSMITTING LINE

[75] Inventors: David L. McGowan, III, Warminster; Steven M. Oxenberg, Richboro, both of Pa.

[73] Assignee: Honeywell Inc., Minneapolis, Minn.

[21] Appl. No.: 914,031

[22] Filed: Oct. 1, 1986

[51] Int. Cl.[4] .................... H04M 11/04; G08C 19/16

[52] U.S. Cl. .......................... 340/310 R; 340/870.18; 340/870.39; 375/5; 375/24

[58] Field of Search .......... 340/310 R, 310 A, 870.39, 340/870.40, 825.06, 870.16, 870.18; 375/5, 7, 24, 36

[56] References Cited

U.S. PATENT DOCUMENTS

| | | | |
|---|---|---|---|
| 4,400,688 | 8/1983 | Johnston et al. | 340/310 R |
| 4,520,488 | 5/1985 | Houvig et al. | 340/310 R |
| 4,611,274 | 9/1986 | Machino et al. | 340/310 R |

*Primary Examiner*—John W. Caldwell, Sr.
*Assistant Examiner*—Tyrone Queen
*Attorney, Agent, or Firm*—Mitchell J. Halista; Albin Medved

[57] ABSTRACT

A transmitter for repeatedly transmitting a measured value in the form of a digital signal through a two-wire transmission line, includes a receiving unit for receiving a digital command signal from a communicator through the two-wire transmission line, and a processor for sending out a response signal in response to the command signal upon reception thereof. The measured value is sent using a newest measured value after repetitive transmission of the measured value is interrupted. The measured value is transmitted from the transmitter by a change in current supplied to the two-wire transmission line, and reception of the command signal is performed by a change in interline voltage of the two-wire transmission line.

15 Claims, 8 Drawing Sheets

TRANSMITTER FOR TRANSMITTING ON A TWO-WIRE TRANSMITTING LINE

BACKGROUND OF THE INVENTION

1. Field of the Invention

The present invention relates to a transmitter suitable for transmitting various measured values through a two-wire transmission line.

2. Description of the Prior Art

In order to transmit outputs from a differential pressure transmitter, an electromagnetic flowmeter or the like representing measured values to a remote location according to conventional industrial measurement techniques, a unique signal having a current level within a range of 4–20 mA is used. Thus, an analog signal having a current level selected from this range represents a measured value. Such differential pressure transmitters, electromagnetic flowmeters and the like are normally arranged in a distributed manner to monitor industrial process states in a wide physical area. Maintenance personnel must travel extensively to maintain and inspect the distributed measuring instruments so as to perform adjustments and check the operating conditions thereof. In order to eliminate such time-consuming maintenance or the like, existing equipment is utilized to achieve remote control operation of the measuring instruments, as described in U.S. Pat. No. 4,520,488.

As shown therein, a transmitter is bridged to a two-wire transmission line to transmit a digital signal. After the digital signal is received by a receiver, the transmitter stops transmitting an analog measured value signal and responds to a digital signal from a communicator. The response signal is then received by the communicator. A similar mode of operation is achieved for digital signal communication between the communicator and the transmitter.

Since when the transmitter communicates with the communicator by means of the digital signal, the transmitter stops transmitting the analog signal, i.e., stops transmitting the measured value, if the measured value concurrently changes, the changed measured value cannot be immediately transmitted to the receiver. Therefore, the receiver cannot perform an immediate control operation according to the changed measured value. This impairs the ability of the state of equipment to be controlled to follow changes in the measured values.

SUMMARY OF THE INVENTION

It is, therefore, an object of the present invention to provide a transmitter capable of transmitting at least one measured value within a predetermined period determined in association with a system and control operations so that an operating state of equipment to be controlled can always follow changes in measured value, even while the transmitter communicates with a communicator to exchange digital signals representing various types of data.

In order to achieve the above object of the present invention, there is provided a transmitter for repeatedly transmitting measured values of digital signals through a two-wire transmission line, comprising means for receiving a command signal as a digital signal sent from a communicator through the transmission line, and control means for transmitting a response signal responsive to the command signal upon its reception so as to transmit at least one measured value within a predetermined period.

DESCRIPTION OF THE PREFERRED EMBODIMENTS

Figure 1:
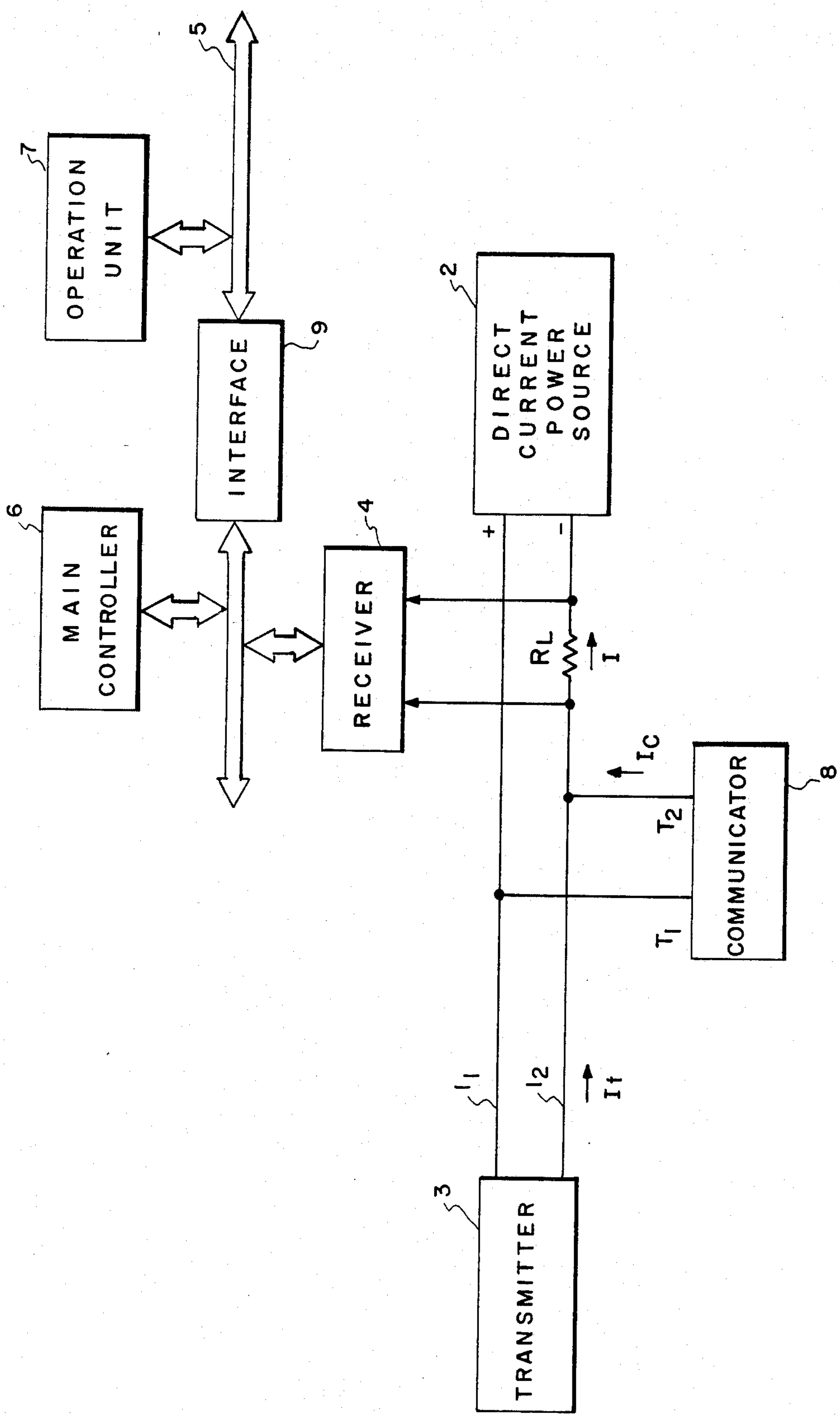
FIG. 1 is a block diagram showing an overall two-wire transmission system configuration.
Figure 2:
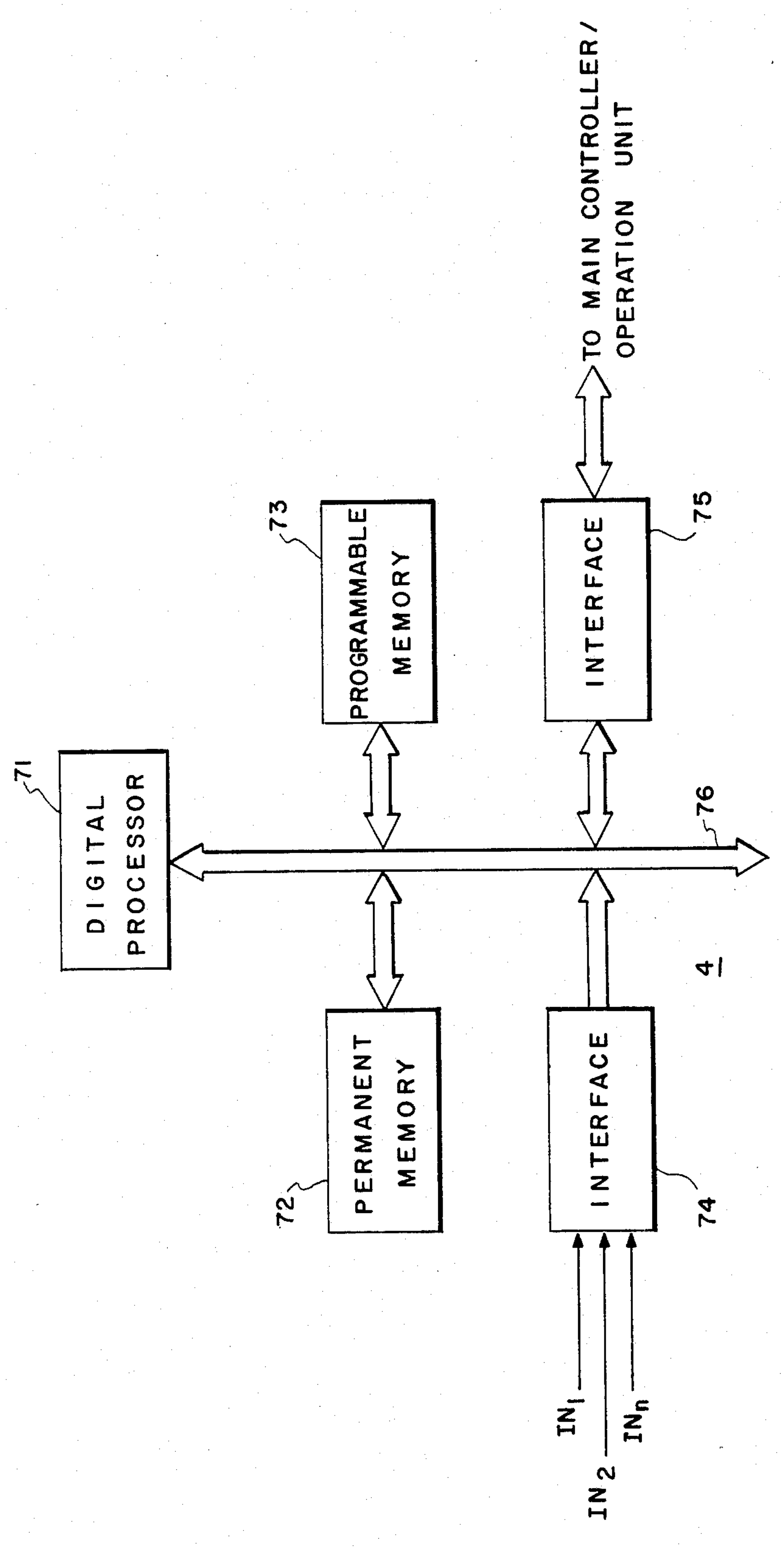
FIG. 2 is a block diagram of a transmitter suitable for use in the system shown in FIG. 1 according to a first embodiment of the present invention.

FIG. 1 is a block diagram showing an overall two-wire transmission system configuration utilizing the present invention. A direct current (DC) power source (referred to as a PS hereinafter) 2 is connected to one end of a two-wire transmission line (referred to as a transmission line) 1 consisting of signal lines $1_1$ and $1_2$ to supply a power current I thereto. A transmitter (referred to as a TX hereinafter) 3 such as a pressure difference transmitter and an electromagnetic flowmeter is connected to the other end of the transmission line. The TX3 3 controls the current I in the transmission line 1 to generate signal pulses. The signal pulses are sent as a digital signal representing a measured process variable value onto the transmission line 1.

A resistor RL as a voltage dropping element is inserted in series with the transmission line 1. A voltage across the resistor RL is supplied to a receiver (referred to as an RX hereinafter) 4 whereby the RX 4 receives the transmitted signal. An output signal from the RX 4 is sent to a main controller (referred to as an MC hereinafter) 6 such as a computer through a bus 5. Control operations by the MC 6 are performed on the basis of the measured value represented by the digital output signal supplied from the RX 4. Control data is sent to controlled equipment (not shown) through the bus 5, thereby controlling the equipment.

An operation unit (referred to as an OP hereinafter) 7, which can include a CRT display and a keyboard, is connected to a bus 5' through an interface (referred to as an I/F hereinafter) 9, for displaying a controlled state of the equipment and inputting a command to the MC 6 and the RX 4. A portable communicator (referred to as a CT hereinafter) 8 is bridged in the transmission line nearer to the TX 3 than the resistor RL. The CT 8 converts the current I into signal pulses and sends them as a digital command signal to the TX 3. The TX 3 receives the command signal and converts the current I into signal pulses as a response signal which is sent to the CT 8 in response to the command signal.

Figure 3:
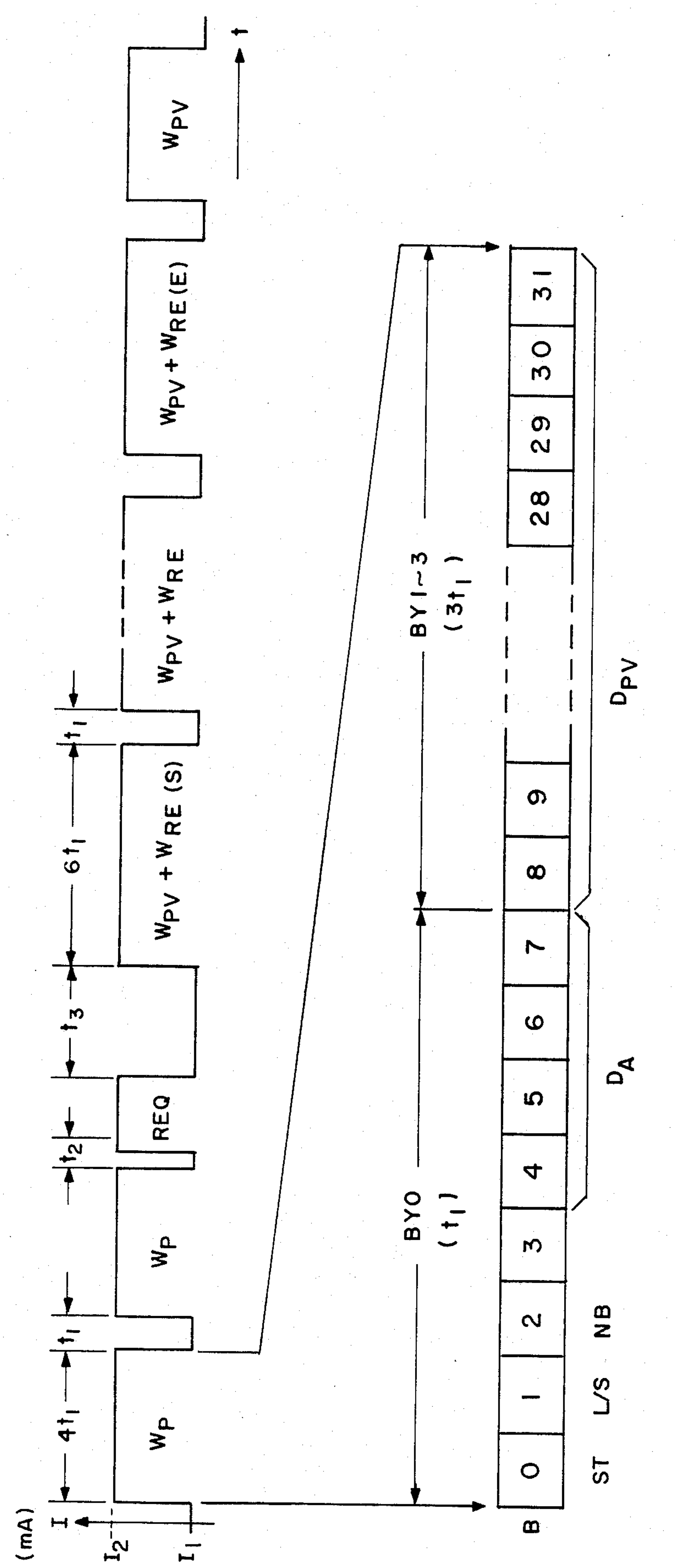
FIG. 3 is a timing chart of a waveform showing changes in current for the two-wire transmission system.

FIG. 3 shows a waveform of changes in current I supplied through the resistor RL as a function of time "t". In this case, the digital signal is a pulse code, the current of which changes in the range of $I_1$ to $I_2$, e.g., 4–20 mA. A measured process value word WPV determined by the measured value from the TX 3 comprises 4-byte data consisting of bytes BY0 to BY3 (each byte consists of eight bits). If the length of time for each of the bytes BY0 to BY3 is "tl", e.g., 50 msec, the length of time of the measured value word WPV is "4tl", and the disable period following the word WPV is "tl". The measured value word WPV is repeatedly transmitted by changes in current "It" supplied across the lines of the TX 3, thereby always transmitting the newest measured value to the RX 4.

In this state, a command signal REQ as a pulse code is transmitted within a reception wait period "t2" shorter than the disable period "tl" by changing of a current Ic supplied from the CT 8 to line terminals T1 and T2 at the end of transmission of the measured value word WPV. The change in current causes a change in voltage across the resistor RL. The change in voltage across the resistor RL is sent as a change in voltage between the signal lines $l_1$ and $l_2$ to the TX 3. Therefore, the command signal REQ is received by the TX 3.

The TX 3 stops transmitting the measured value word WPV in response to the command signal REQ and sends back a 2-byte response word WRE corresponding to the command signal REQ by means of the current It. In this case, the TX 3 transmits at least one measured value word within a predetermined period T1 which is determined in accordance with the system's control and safety requirements. If the response word WRE is long, it is divided into WREl, WRE2, WRE3, . . . which are then sequentially time-divisionally sent. Referring to FIG. 3, the period T2 shorter than the predetermined period T1 is monitored. If the short period T2 exceeds the predetermined period T1, the response word WPV is partially sent to assure the system control and safety measures, and the remaining portion of the response word WPV is then sent. After transmission of the response word WPV, the period T2 is monitored. If the period T2 exceeds the period T1, the response word WPV is transmitted. The relationship between the periods T1 and T2 is determined to transmit one WPV within T1. Thus, the voltage between the lines $l_1$ and $l_2$ is changed, and this change is received by the CT 8.

A start bit B0 of bits B0 to B31 in the start byte BY0 in the measured word WPV represents status ST indicating whether the TX 3 is normally operated. The bit B1 represents a proportional relation L, i.e., a linear relationship between the measured value and the control value according to sensor characteristics, or a squared proportional relationship S, i.e., a relationship representing that the measured value is a square of the control value. The bit B2 represents the number NB of continuous bytes, i.e., that the number of continuous bytes is four or six. The bits B4 to B7 represent the type DA of the measured value transmitted by the bytes BY1 to BY3. In the byte after byte BYl, the bits B4 to B7 represent a measured value DPV. The number of bytes of each word and the number of bits of each byte can be determined according to the control states. The periods "t1" to "t3" are also properly determined according to the bit rate.

Figure 4:
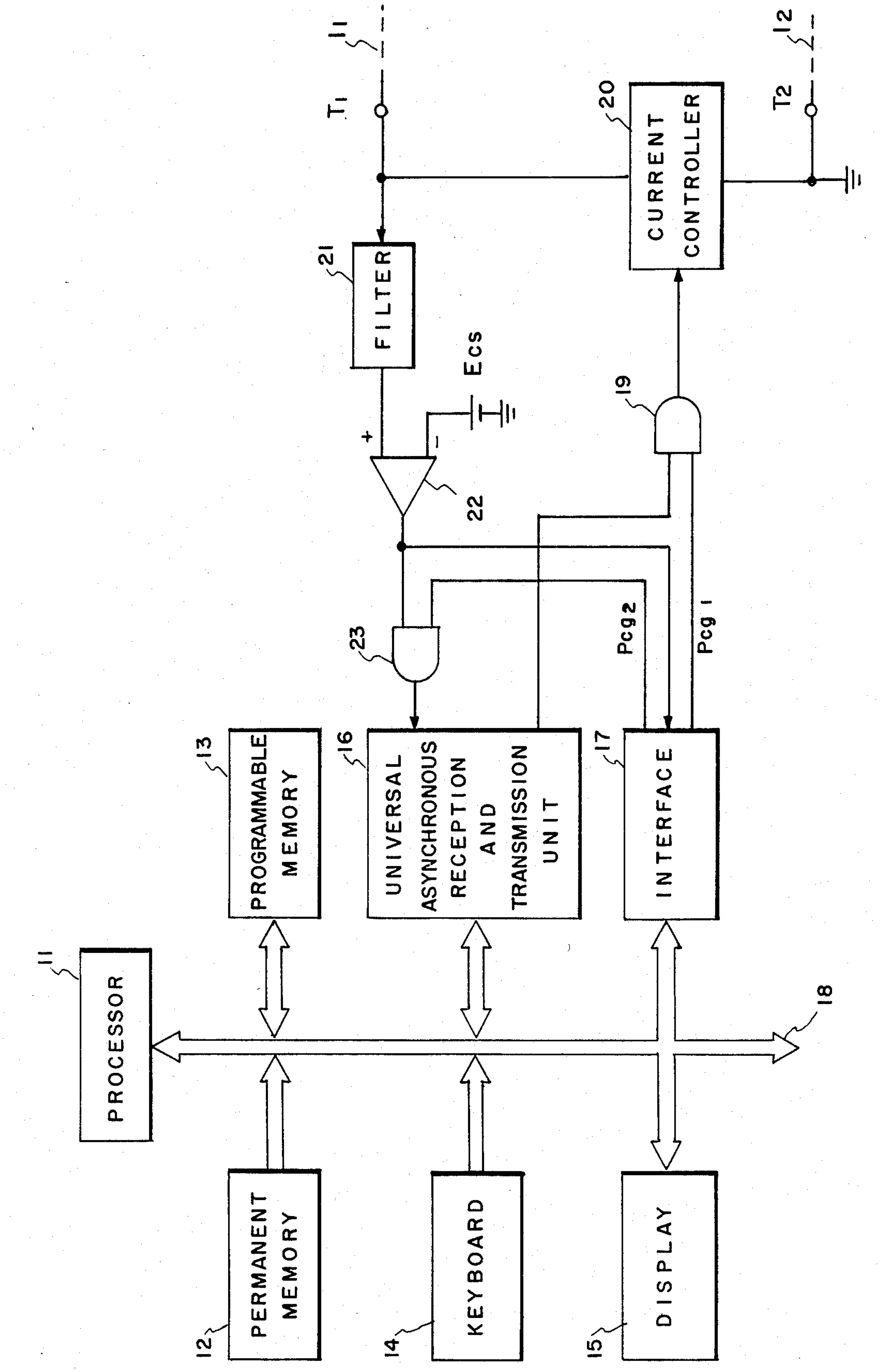
FIG. 4 is a block diagram of a communicator used in the system shown in FIG. 1.

FIG. 4 is a block diagram of the CT 8. A digital processor (referred to as a CPU hereinafter) 11 such as a microprocessor is used in the CT 8. The CPU 11 is connected to a permanent memory (referred to as a ROM hereinafter) 12, a programmable memory (referred to as a RAM hereinafter) 14, a display (referred to as a DP) 15 such as a numerical display, a universal asynchronous reception and transmission unit (referred to as an I/F hereinafter) 17. The above components are connected to each other through a bus 18. A program stored in the ROM 12 is used under the control of the CPU 11, and a control operation is performed while predetermined data is accessed to the RAM 13.

If desired input data is supplied at the KB 14, the CPU 11 controls the UART 16 and sends a gate pulse "Pcgl" as an "H" (high level) signal to the I/F 17. The AND gate 19 is turned on to gate the "H" pulse from the UART 16 to a current controller (referred to as a CC hereinafter) 20. Therefore, a current Ic is supplied from the terminal T1 to the terminal T2.

A voltage between the lines $l_1$ and $l_2$ is supplied to a filter (referred to as an FL hereinafter) 21 for filtering only a frequency component of the digital signal. The filtered signal is then supplied to one input terminal of a comparator (referred to as a CP hereinafter) 22. The filtered signal is compared by the CP 22 with a reference voltage Ecs supplied to the other input terminal thereof. The CP 22 extracts as an output a level exceeding the reference voltage Ecs.

For this reason, after the transmission of the command signal REQ, a gate pulse "Pcg2" is sent out as an "H" pulse from the I/F 17 when the output representing the start bit B0 of the measured value word WPV is supplied through the I/F 17. The AND gate 23 is turned ON, and then the output representing the bit B1 and the subsequent bits is sent to the UART 16. The resulting data is displayed on the DP 15 is response to this output. Even if the TX 3 repeatedly transmits the measured value word WPV, the reception is normally performed. Therefore, the measured value can be displayed on the DP 15.

Figure 5:
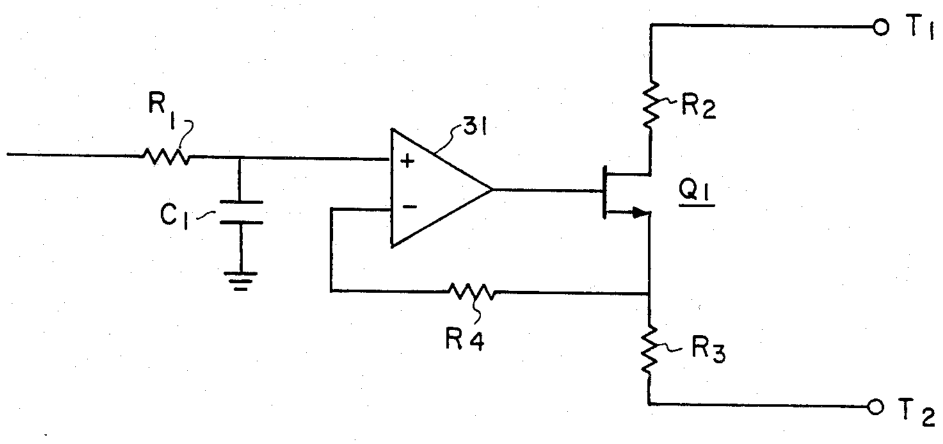
FIG. 5 is a circuit diagram of a current controller used in the system shown in FIG. 2.

FIG. 5 is a circuit diagram of the CC 20. A transmission pulse from the AND gate 19 through a noise reduction low-pass filter consisting of a resistor R1 and a capacitor C1 is amplified by a differential amplifier (referred to as an A hereinafter) 31 to turn on a transistor Q1 such as a field effect transistor. The current Ic is supplied through resistors R2 and R3. A voltage across the resistor R3 is negatively fed back to the A 31 through a resistor R4 so that the current Ic is maintained at a predetermined value.

Figure 6:
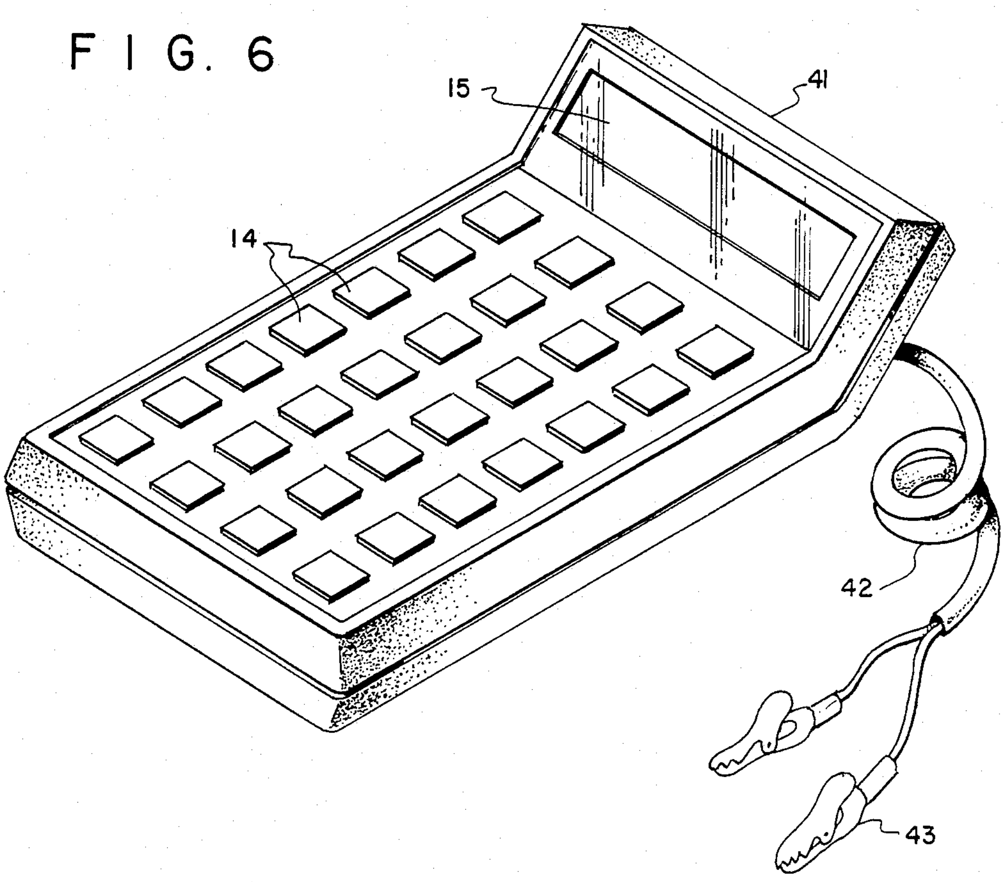
FIG. 6 is a perspective pictorial view showing an outer physical appearance of the communicator shown in FIG. 5, FIGS. 7(A) and 7(B) charts for explaining the control operations, and FIGS. 8 (A) to 8(C) are timing charts for explaining a second embodiment of the present invention.

FIG. 6 is a perspective pictorial view showing the outer physical appearance of the CT 8. The DP 15 and the KB 14 are arranged on a portable case 41. At the same time, a cord 42 extends outside the case 41. Clips 43 are line terminals T1 and T2 connected at the distal end of the cord 42. Therefore, the CT 8 can be detachably connected to transmission lines $l_1$ and $l_2$.

FIG. 1 is a block diagram of the TX 3. In the same manner as in FIG. 4, a CPU 51 is connected to a ROM 52, a RAM 53, a UART 54, and an I/F 55 through a bus 56. The CPU 51 performs the control operation in the same manner as in FIG. 4. In addition, the TX 3 further includes a multiplexer (referred to as an MPX hereinafter) 59 for selecting a pressure sensor (referred to as a PSS hereinafter) 57 for detecting a pressure difference or the like, or a temperature sensor (referred to as a TSS) 58 for detecting a temperature of the PSS 57, and an analog-to-digital converter (referred to as an ADC hereinafter) 60 for converting an output from the MPX 59 into a digital signal.

A direct current power source circuit (referred to as a PSC hereinafter) 61 is connected to the terminal T1.

In this case, a current of 4 mA from the line $1_1$ is received and stabilized as a local power source Et. The source Et is supplied to the respective components by electrical connection lines which have been omitted for the sake of clarity. The voltage between the transmission lines $1_1$ and $1_2$ is filtered through a FL 62 such as a band-pass filter for filtering only the frequency component of the digital signal therethrough. The filtered output is supplied to a CP 63 in the same manner as in FIG. 4. The filtered output is compared with a reference voltage Ets and the CP 63 generates a reception output. The reception output is supplied to the UART 54 through an AND gate 64.

If the "H" gate pulse "Ptgl" is sent in the reception mode after the measured value word WPV is completely sent, the AND gate 64 is turned ON. During the ON state of the AND gate 64, the command signal REQ is sent. In response to the command signal REQ, the reception output from the CP 63 is sent to the UART 54 to receive the command signal REQ. Thereafter, the CC 65 is turned off, and repetitive transmission of the measured value word WPV is interrupted.

Upon reception of the command signal REQ, the CPU 51 sends the "H" gate pulse "Ptg2" through the I/F 55 and at the same time controls the UART 54. The transmission pulse is sent to the CC 65 through the AND gate 66. The current corresponding to the word WRE is supplied through the CC 65.

When transmission of the words WPV and WRE representing the measured value and the response signal as described with reference to FIG. 3 is completed, the CPU 51 repeats sending out the transmission pulse in response to the measured value word WPV, thereby repetitively sending the measured value. The arrangement of the CC 65 is the same as that in FIG. 5. The TX 3 includes a nonvolatile memory 52 such as an EAROM whereby required data is stored in the nonvolatile memory 52. Even if a power failure occurs, the data can be retained in the nonvolatile memory 52.

The CPU 51 controls the MPX 59 to alternately fetch the outputs from the PS 57 and the TS 58 at every predetermined interval. The fetched data is stored in the RAM 53. The CPU 51 then performs conversion operations of the detection output from the PS 57 and encodes the measured value. The coded measured value is sent to the UART 54 so that the measured value word WPV is sent. However, depending on the contents of the command signal REQ, the detection output from the TS 58 is sent out in the same manner as described above, or the outputs from the PS 57 and the TS 58 are sent alternately or in a combination thereof.

Figure 7A:
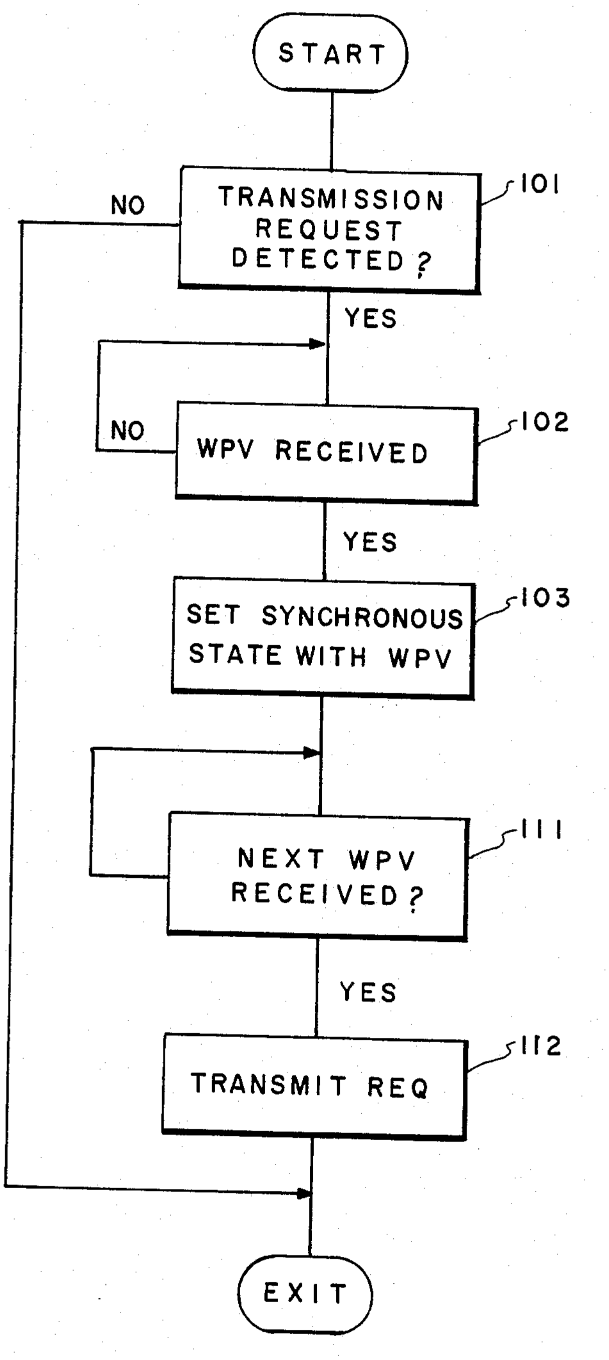
Figure 7B:
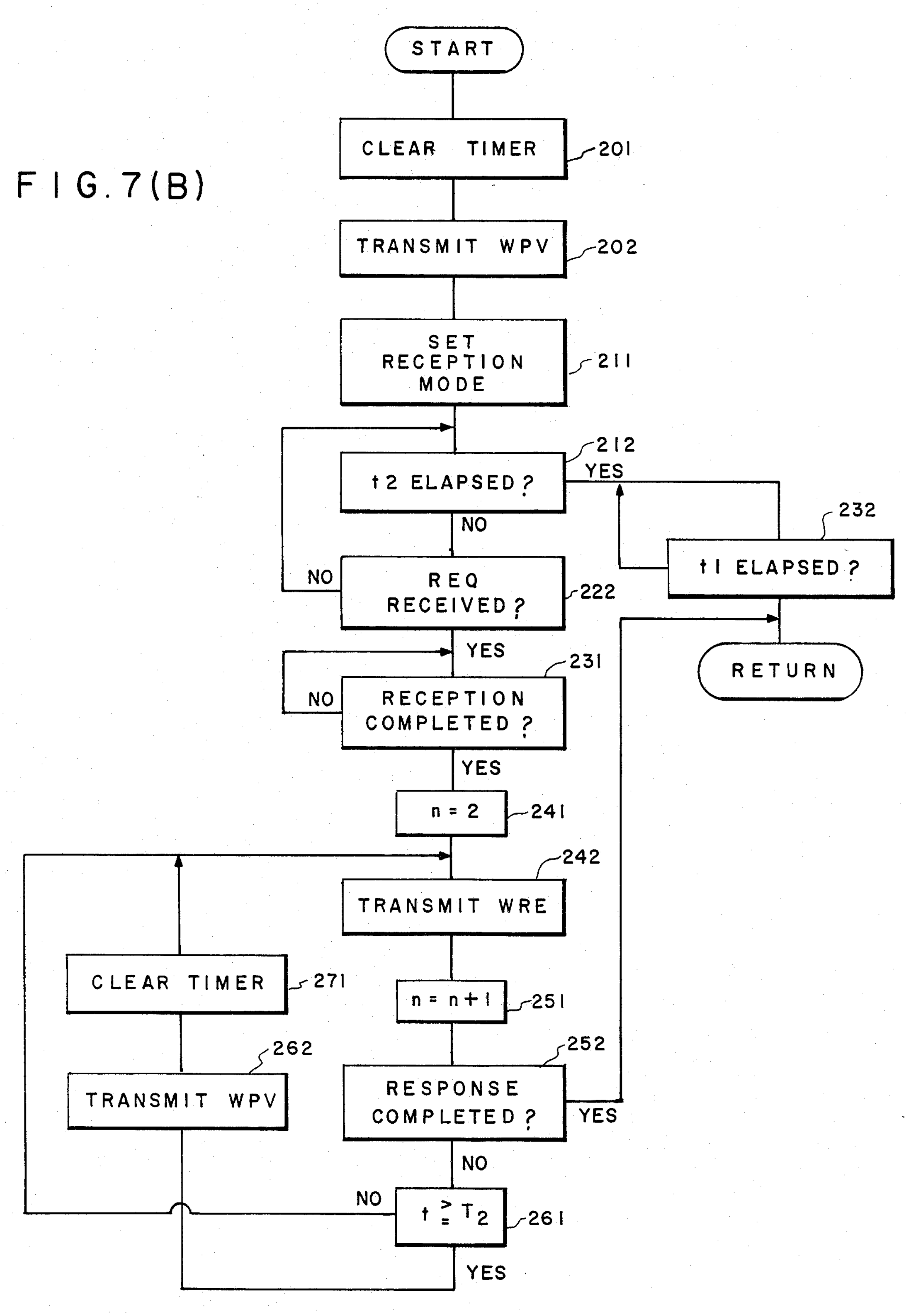

FIGS. 7(A) and 7(B) are flow charts showing the operations of the CPUs for controlling the CT 8 and the TX 3, respectively. More specifically, FIG. 7(A) shows the control operation of the CPU 11 in the CT 8, and FIG. 7(B) shows the control operation of the CPU 51 in the TX 3. Referring to FIG. 7(A), the CPU 11 determines in step 101 whether a transmission request is present. If YES in step 101, the CPU 11 determines in step 102 whether WPV is received If YES in step 102, a counter incorporated in the CPU 11 for defining the transmission timing is restarted to perform "Setting of Synchronous State with WPV". The CPU 11 determines whether the next WPV has been received. If YES in 111 according to the transmission timing on the basis of a frequency-divided output of the clock pulse by means of this counter, the command signal REQ is sent out in step 112. The program flow advances to "Exit" and other routines and then returns to step 101. The command signal REQ is transmitted as soon as the measured value word WPV is completely transmitted, as shown in FIG. 3.

Referring to FIG. 7(B), the CPU 51 performs "Timer Clear (t)" for clearing the timer for monitoring a predetermined period and for causing the timer to start counting in step 201. The CPU 51 then sends the measured value word WPV in step 202 and sets the reception mode in step 211. The CPU 51 then determines in step 212 whether the reception wait period "tl" (FIG. 3) has elapsed after the end of step 201. If NO in step 212, the CPU 51 determines in step 222 whether the command signal REW is received. If NO in step 222, the operations in step 212 and the subsequent steps are repeated. However, if YES in step 222 while NO in step 212, the program flow advances to step 231. The CPU 51 determines in step 231 whether the reception is completed. If YES in step 231, the CPU 51 performs "n=1" in step 241. The CPU 51 then sends the response signal word WREn in step 242, as described with reference to FIG. 3. The CPU 51 performs "n=n+1" in step 251. The CPU 51 determines in step 252 whether the response is completed. While NO in step 252, the CPU 51 determines in step 252 whether the timer time "t" exceeds "T2". If NO in step 261, the flow returns to step 242. However, if YES in step 261, the word WPV is sent in step 262 so as to completely send the word WPV within the predetermined period T1. After the word WPV is sent, the timer is cleared in step 271. The CPU 51 then monitors the period T2, and the flow returns to step 242. If YES in step 212 while NO in step 222, the program flow advances to step 322. If the CPU determines that the disable period tl has elapsed, i.e., if YES in step 232, the operations in step 201 and the subsequent steps are repeated.

The start of reception of the command signal REQ is allowed for a short reception wait period "t2" after the end of transmission of the measured value word WPV. During this period, if the command signal REQ is received, the gate pulse "Ptgl" is continuously sent out until the reception is completed. However, if reception is not performed within the reception wait period "t2", the gate pulse "ptgl" is disabled after the lapse of the period "t2". The reception mode is cancelled to prevent an operation failure caused by reception of noise or the like.

The insertion of the disable period "tl" allows the RX 4 to detect the start of each word following the reception wait period "t2" upon detection of the disable period "tl". The number NB of bytes in FIG. 3 counted from this timing are fetched as significant bytes. Therefore, only the measured value word WPV can be accurately received.

An address code or the like for designating a destination need not be added to each word and each signal, and communication between the TX 3 and the RX 4 can be accurately performed while system disturbance is properly eliminated during measured value transmission between the TX 3 and the RX 4. At the same time, the RX 4 causes a simple means such as timer to selectively receive the measured value word WPV.

Figures 8A, 8B, 8C:
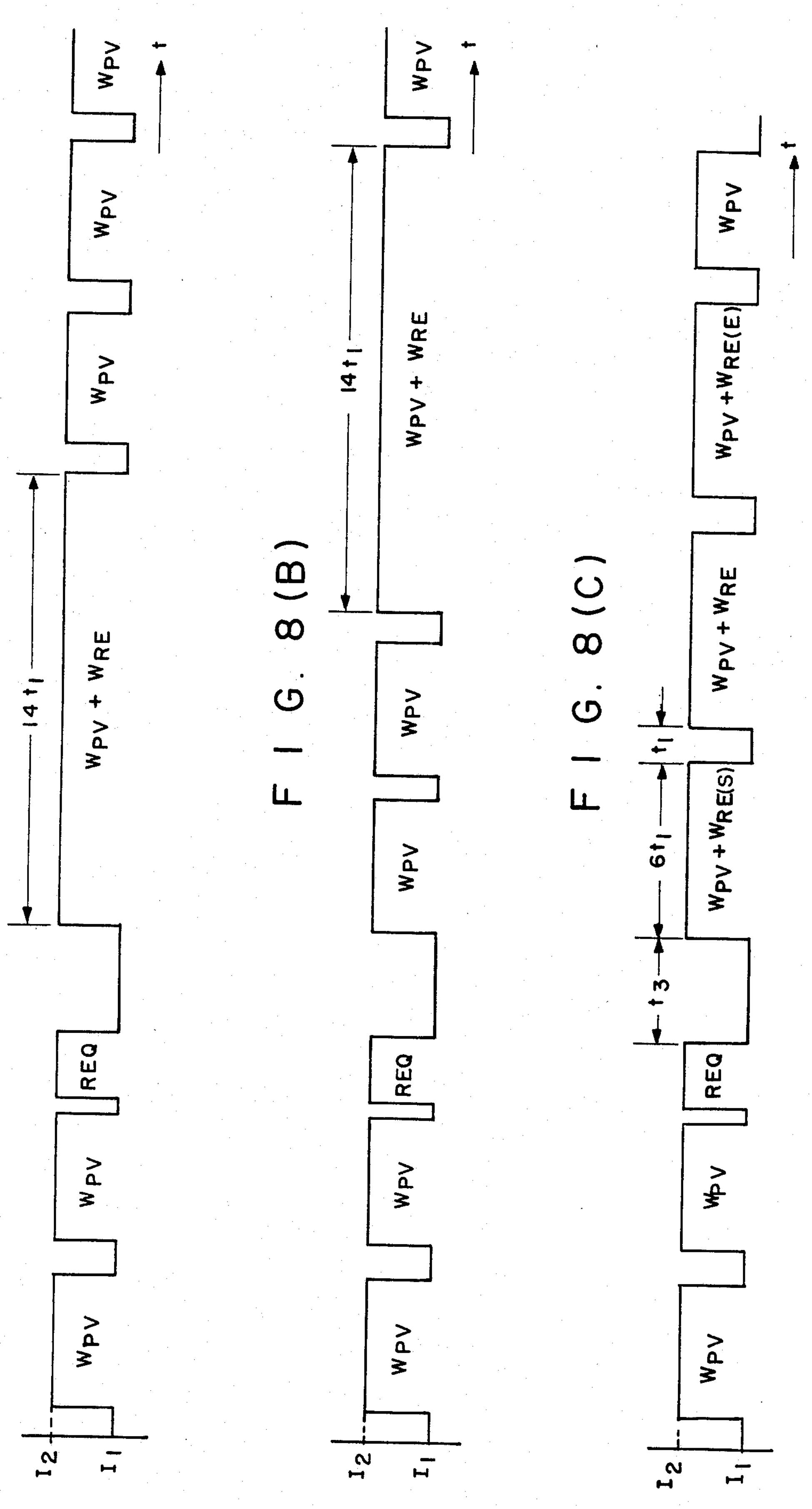

FIGS. 8(A) to 8(C) are timing charts showing another embodiment of the present invention. FIG. 8(A) shows a case wherein a measured value word WPV and a response word WRE are sent together as 14-byte data within a time period "14tl". FIG. 8(B) shows a case wherein the measured value word WPV based on the newest measured value is transmitted twice after reception of the command signal REQ, and then the measured value word WPV and the response signal word WRE are sent as 14-byte data in the same manner as in FIG. 8(A).

If the measured value word TPV based on the newest measured value is always sent to the RX 4, it is suitable to allow the TX 4 to perform a control function. However, for allowable variations in measured values, the immediately preceding value may be repeatedly sent. If a variation exceeding the allowable range occurs, the newest measured value may be sent.

Referring to FIG. 8(C), the TX 3 interrupts transmission of the measured value word WPV in response to the command signal REQ. When a predetermined period "t3" has elapsed after the end of the command signal REQ, 4-byte measured value word WPV and 2-byte response word WRE in response to the command signal REQ are sent together by means of a current It. This transmission for a period "6tl" from a start word WRE(S) to an end word WRE(E) is repeatedly performed through the disable period "tl". The measured value word WPV is repeatedly sent again.

Transmission of data including the measured value word WPV guarantees transmission of the measured value while the CT 8 communicates with the TX 3. The control state in the RX 4 can always follow the changes in measured value and the response time of the control state is improved. The measured value word WPV and the response signal word WRE are sent together when the predetermined period t3 has elapsed, thereby easily discriminating the measured value word WPV and preventing control disturbance in the RX 4.

The predetermined period "t3" can be defined not only by a timer but also by various time defining means. For example, a transmission timing definition pulse may be generated by frequency-dividing a clock pulse, and the timer time may be defined by a transmission timing pulse after reception of the control signal REQ.

In the above embodiment, the CPU 51 is used as a control means. However, the control means may be a control circuit constitued by a combination of various logic circuits. Referring to FIG. 3, a parity check bit may be added to each byte or an identification code or the like of the TX 3 may be added. The period "tl" may be equal to the period t3 according to given conditions.

According to the present invention as is apparent from the above description, there has been provided, a transmitter whereby the transmission of the measured value can be performed during communication between the TX and the CT. The control state in the RX can follow changes in the measured value. At the same time, the reception of the measured value can be discriminated in the RX since the predetermined period is set.

The embodiments of the present invention in which an exclusive property or privilege is claimed are defined as follows:

1. A transmitter for transmitting a measured value of a process variable in the form of a digital signal through a two-wire transmission line by a change in a current in the two-wire transmission line comprising means for receiving a digital command signal supplied through said two-wire transmission line and control means for adding the measured value to a digital response signal generated in response to the digital command signal and for transmitting a resultant digital signal so as to transmit on the two-wire transmission line at least one measured value within a predetermined time period.

2. A transmitter according to claim 1 wherein the measured value is sent as a newest measured value after the transmission of the measured value is interrupted for said predetermined time period.

3. A transmitter according to claim 1 wherein the reception of the command signal utilizes a change in an interline voltage of said two-wire transmission line.

4. A transmitter according to claim 1 and including means for monitoring said predetermined period comprising a timer.

5. A transmitter according to claim 1 wherein said control means comprises a digital processor.

6. A transmitter for repeatedly transmitting a measured value of a process variable in the form of a digital signal through a two-wire transmission line by a change in a current in the two-wire transmission line comprising means for receiving a digital command signal supplied through said two-wire transmission line and control means for adding the measured value to a digital response signal generated in response to the digital command signal and for repeatedly transmitting a resultant digital signal so as to transmit on the two-wire transmission line at least one measured value within a predetermined time period.

7. A transmitter according to claim 6 wherein the measured value is sent as a newest measured value after the repetitive transmission of the measured value is interrupted for said predetermined time period.

8. A transmitter according to claim 6 wherein the reception of the command signal utilize a change in an interline voltage of said two-wire transmission line.

9. A transmitter according to claim 6 and including means for monitoring said predetermined period comprising a timer.

10. A transmitter according to claim 6 wherein said control means comprises a digital processor.

11. A transmitter for transmitting a measured value of a process variable in the form of a digital through a two-wire transmission line by a change in a current in the two-wire transmission line comprising means for receiving a digital command signal supplied through said two-wire transmission line, means for digitally transmitting on said transmission at least one measured value of the process variable within a predetermined time period and control means for adding the measured value to a response signal generated in response to the digital command signal and for transmitting a resultant digital signal on said transmission line.

12. A transmitter according to claim 11 wherein the measured value is sent as a newest measured value after the transmission of the measured value is interrupted for said predetermined time period.

13. A transmitter according to claim 11 wherein the reception of the command signal utilizes a change in an interline voltage of said two-wire transmission line.

14. A transmitter according to claim 11 and including means for monitoring a predetermined period comprising said time.

15. A transmitter according to claim 11 wherein said control means comprises a digital processor.

* * * * *